(12) United States Patent
Jo et al.

(10) Patent No.: US 11,893,196 B2
(45) Date of Patent: Feb. 6, 2024

(54) ELECTRONIC DEVICE COMPRISING BONDING LAYER IN CONTACT WITH ACTIVE AREA OF DIGITIZER

(71) Applicant: SAMSUNG ELECTRONICS CO., LTD., Suwon-si (KR)

(72) Inventors: Jeonggyu Jo, Suwon-si (KR); Jungchul An, Suwon-si (KR); Byunghoon Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 52 days.

(21) Appl. No.: 17/833,107

(22) Filed: Jun. 6, 2022

(65) Prior Publication Data

US 2022/0382399 A1 Dec. 1, 2022

Related U.S. Application Data

(63) Continuation of application No. PCT/KR2022/006789, filed on May 12, 2022.

(30) Foreign Application Priority Data

May 26, 2021 (KR) ........................ 10-2021-0067753

(51) Int. Cl.
*G06F 3/046* (2006.01)
*B32B 7/12* (2006.01)
*B32B 3/30* (2006.01)

(52) U.S. Cl.
CPC .............. *G06F 3/046* (2013.01); *B32B 3/30* (2013.01); *B32B 7/12* (2013.01); *B32B 2307/732* (2013.01); *B32B 2457/208* (2013.01); *G06F 2203/04102* (2013.01)

(58) Field of Classification Search
None
See application file for complete search history.

(56) References Cited

U.S. PATENT DOCUMENTS

| 7,552,861 | B2 | 6/2009 | Chen et al. |
| 10,437,368 | B2 | 10/2019 | Ozawa et al. |
| 10,719,142 | B2 | 7/2020 | Kaplan et al. |

(Continued)

FOREIGN PATENT DOCUMENTS

| CN | 104881198 | 9/2015 |
| KR | 10-1060210 | 8/2011 |

(Continued)

OTHER PUBLICATIONS

Search Report dated Aug. 17, 2022 in counterpart International Patent Application No. PCT/KR2022/006789.

*Primary Examiner* — Kirk W Hermann
(74) *Attorney, Agent, or Firm* — Nixon & Vanderhye, P.C.

(57) ABSTRACT

An electronic device including a bonding layer in contact with an active area of a digitizer may include: the digitizer, a main magnet attached to a surface of the digitizer, a flexible printed circuit board electrically connected to the digitizer, and a bonding layer connecting the digitizer and the flexible printed circuit board, wherein the flexible printed circuit board includes a base part overlapping the bonding layer with respect to a stacking direction of the digitizer, the flexible printed circuit board, and the bonding layer, and extension parts extending toward the main magnet from the base part.

20 Claims, 11 Drawing Sheets

(56) References Cited

U.S. PATENT DOCUMENTS

| 10,884,531 | B2 | 1/2021 | Yang et al. | |
|---|---|---|---|---|
| 2009/0107736 | A1 | 4/2009 | Ben-Eliyahu et al. | |
| 2011/0214923 | A1 | 9/2011 | Chen et al. | |
| 2018/0107250 | A1* | 4/2018 | Cho | H10K 77/111 |
| 2018/0232089 | A1* | 8/2018 | Ozawa | G06F 3/0443 |
| 2019/0258295 | A1* | 8/2019 | Fujimoto | G09F 9/00 |

FOREIGN PATENT DOCUMENTS

| KR | 10-2012-0079598 | 7/2012 | |
|---|---|---|---|
| KR | 10-2014-0112800 | 9/2014 | |
| KR | 10-2014-0123434 | 10/2014 | |
| KR | 10-2016-0028586 | 3/2016 | |
| KR | 10-2016-0090978 | 8/2016 | |
| KR | 10-1653719 | 9/2016 | |
| KR | 10-2174150 | 11/2020 | |
| KR | 20140123434 A | * 11/2020 | |

* cited by examiner

ELECTRONIC DEVICE COMPRISING BONDING LAYER IN CONTACT WITH ACTIVE AREA OF DIGITIZER

CROSS-REFERENCE TO RELATED APPLICATIONS

This application is a continuation of International Application No. PCT/KR2022/006789 designating the United States, filed on May 12, 2022, in the Korean Intellectual Property Receiving Office and claiming priority to Korean Patent Application No. 10-2021-0067753, filed on May 26, 2021, in the Korean Intellectual Property Office, the disclosures of which are incorporated by reference herein in their entireties.

BACKGROUND

1. Field

The disclosure relates to an electronic device including a bonding layer in contact with an active area of a digitizer.

2. Description of Related Art

Technology for recognizing a motion of a pen that moves on a display has been developed. A wound coil and a radio frequency generator are provided inside the pen. A digitizer is provided at the display. A magnetic field is generated when an alternating current power source is supplied to the digitizer. According to the law of electromagnetic induction, the pen may transmit a signal, which is recognizable by the digitizer, through an internal circuit when a current flows inside the pen close to a surface of the display. The digitizer may recognize an intensity and position of the signal.

The digitizer may include an active area provided with a wire and an inactive area not including a wire. For example, in case the digitizer has a thin layer shape, if a plurality of wires of which a length direction is formed in an x-axial direction is disposed in an y-axial direction, a surface in a z-axial direction among outer surfaces of the digitizer may be the active area, and a surface in the x-axial direction or the y-axial direction among the outer surfaces of the digitizer may be the inactive area.

A bonding area for connecting a flexible printed circuit board configured to transmit a signal may be provided on a surface of the digitizer. Since the inactive area of the digitizer is an area on which waterproof tape of the display is placed, in case a bonding layer is provided on the inactive area thereof, the durability of the waterproof tape may be deteriorated. Thus, to secure the waterproof performance to a desired level, there is a demand for technology to provide a bonding layer in an active area of a digitizer.

The digitizer is attached to a rear surface of the display. A magnet is attached to a rear surface of the digitizer, that is, an active area of the digitizer. In case a bonding layer is provided on the active area of the digitizer, a space between the bonding layer and the magnet may occur. The space may cause a gap inside the display when manufacturing the display. The gap may cause a visibility difference between a portion in which the gap is formed and a portion in which the gap is not formed.

Since the active area of the digitizer includes a portion in which a wire is provided and a portion in which a wire is not provided, a surface may be uneven. For example, a plurality of wires is provided in the digitizer, and a bonding defect between the digitizer and the bonding layer may occur in an area between the wires.

Thus, there is a demand for a technology to solve problems that may occur while providing a bonding layer in an active area of a digitizer.

SUMMARY

Embodiments of the disclosure may provide an electronic device including a bonding layer in contact with an active area of a digitizer.

According to various example embodiments, an electronic device including a bonding layer in contact with an active area of a digitizer is provided, the electronic device includes: the digitizer, a main magnet attached to a surface of the digitizer, a flexible printed circuit board electrically connected to the digitizer, and a bonding layer connecting the digitizer and the flexible printed circuit board, wherein the flexible printed circuit board may include a base part overlapping the bonding layer with respect to a stacking direction of the digitizer, the flexible printed circuit board, and the bonding layer, and extension parts of the flexible printed circuit board extending toward the main magnet from the base part.

According to various example embodiments, an electronic device including a bonding layer in contact with an active area of a digitizer, the electronic device includes: the digitizer, a flexible printed circuit board electrically connected to the digitizer, and a bonding layer connecting the digitizer and the flexible printed circuit board, wherein the digitizer may include a first layer, a plurality of first wires disposed on the first layer, a dummy wire disposed between two adjacent first wires among the plurality of first wires, a second layer attached to the first layer, a second wire disposed on the second layer and overlapping the first wire, and a plurality of wire pads disposed on the second layer, and overlapping the plurality of first wires and the dummy wires.

According to various example embodiments, an electronic device including a bonding layer in contact with an active area of a digitizer, the electronic device includes: the digitizer, a flexible printed circuit board electrically connected to the digitizer, and a bonding layer connecting the digitizer and the flexible printed circuit board, wherein the flexible printed circuit board may include a base part overlapping the bonding layer with respect to a stacking direction of the digitizer, the flexible printed circuit board, and the bonding layer, and extension parts of the flexible printed circuit board extending from the base part in a direction perpendicular to the stacking direction thereof, and protruding parts of the flexible circuit board protruding toward the digitizer from the extension part.

According to various example embodiments, an electronic device including a bonding layer in contact with an active area of a digitizer may reduce a space between a bonding layer and a magnet through an extension part and a protruding part of a flexible printed circuit board.

According to various example embodiments, an electronic device including a bonding layer in contact with an active area of a digitizer may enhance the bonding performance of the digitizer and the bonding layer through a dummy wire disposed between two adjacent wires of a plurality of wires of the digitizer.

In addition, various effects directly or indirectly ascertained through the present disclosure may be provided.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
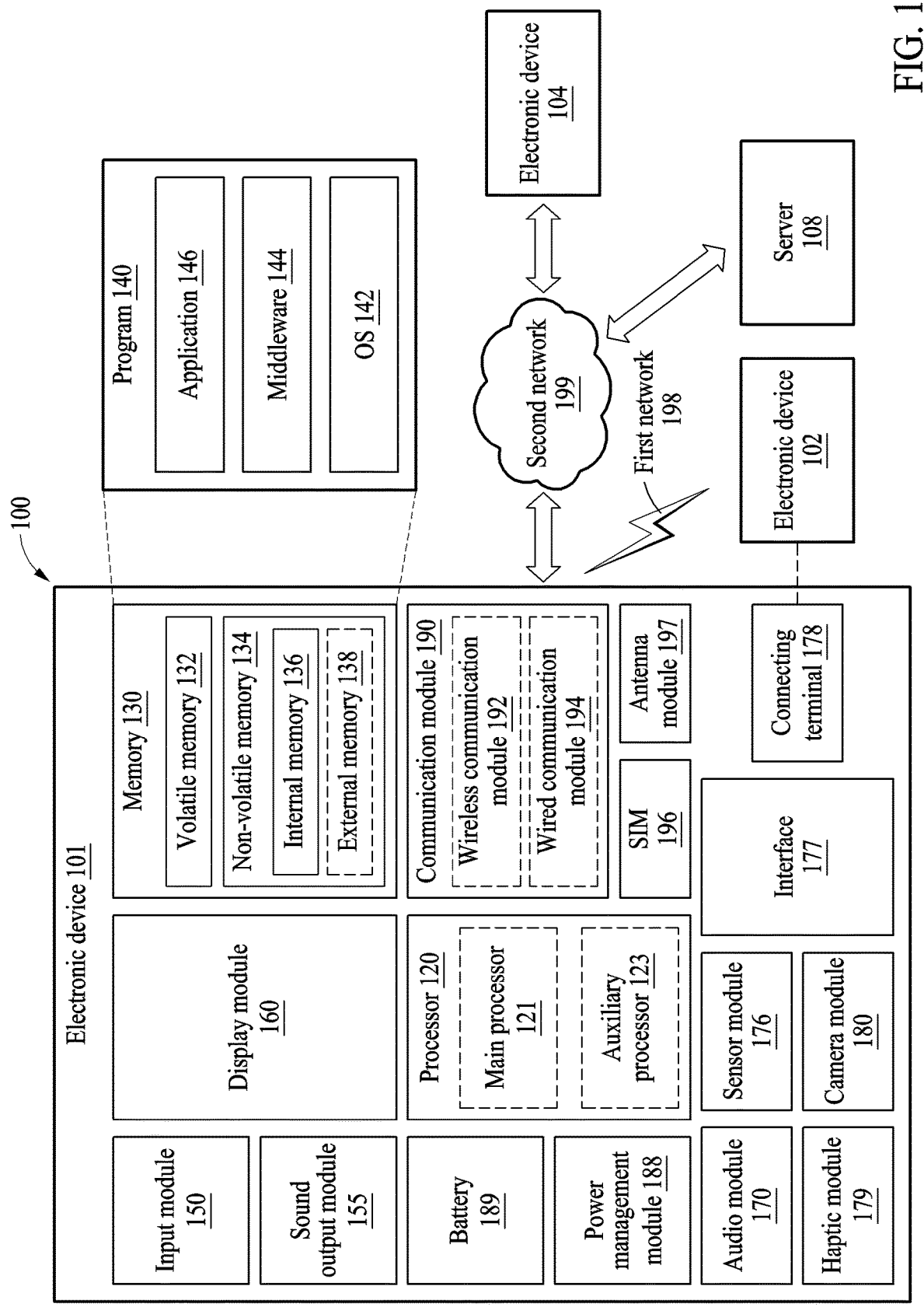
FIG. 1 is a block diagram illustrating an example electronic device in a network environment according to various example embodiments.

Hereinafter, various example embodiments will be described in greater detail with reference to the accompanying drawings. When describing the example embodiments with reference to the accompanying drawings, like reference numerals may refer to like elements and a repeated description related thereto may not be provided.

FIG. 1 is a block diagram illustrating an example electronic device 101 in a network environment 100 according to various example embodiments. Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an example embodiment, the electronic device 101 may communicate with the electronic device 104 via the server 108. According to an example embodiment, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various example embodiments, at least one (e.g., the connecting terminal 178) of the above components may be omitted from the electronic device 101, or one or more other components may be added in the electronic device 101. In various example embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an example embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an example embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is in an active state (e.g., executing an application). According to an example embodiment, the auxiliary processor 123 (e.g., an ISP or a CP) may be implemented as a portion of another component (e.g., the camera module 180 or the communication module 190) that is functionally related to the auxiliary processor 123. According to an example embodiment, the auxiliary processor 123 (e.g., an NPU) may include a hardware structure specified for artificial intelligence (AI) model processing. An AI model may be generated by machine learning. Such learning may be performed by, for example, the electronic device 101 in which an artificial intelligence model is executed, or performed via a separate server (e.g., the server 108). Learning algorithms may include, but are not limited to, for example, supervised learning, unsupervised learning, semi-supervised learning, or reinforcement learning. The artificial intelligence model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The artificial intelligence model may additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 and an external memory 138.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an example embodiment, the receiver may be implemented separately from the speaker or as a part of the speaker.

The display module 160 may visually provide information to the outside (e.g., a user) of the electronic device 101. The display module 160 may include, for example, a control circuit for controlling a display, a hologram device, or a projector and control circuitry to control a corresponding one of the display, the hologram device, and the projector. According to an example embodiment, the display device 160 may include a touch sensor adapted to sense a touch, or a pressure sensor adapted to measure an intensity of a force incurred by the touch.

The audio module 170 may convert a sound into an electric signal or vice versa. According to an example embodiment, the audio module 170 may obtain the sound via the input device 150 or output the sound via the sound output device 155 or an external electronic device (e.g., an electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an example embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an example embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an example embodiment, the haptic module 179 may include, for example, a motor, a piezoelectric element, or an electric stimulator.

The camera module 180 may capture a still image and moving images. According to an example embodiment, the camera module 180 may include one or more lenses, image sensors, ISPs, or flashes.

The power management module 188 may manage power supplied to the electronic device 101. According to an example embodiment, the power management module 188 may be implemented as, for example, at least a part of a power management integrated circuit (PMIC).

The battery 189 may supply power to at least one component of the electronic device 101. According to an example embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to an example embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an example embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an example embodiment, the antenna module 197 may include an antenna including a radiating element including a conductive material or a conductive pattern formed in or on a substrate (e.g., a printed circuit board (PCB)). According to an example embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an example embodiment, another component (e.g., a radio frequency integrated circuit (RFIC)) other than the radiating element may be additionally formed as a part of the antenna module 197.

According to various example embodiments, the antenna module 197 may form a mmWave antenna module. According to an example embodiment, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an example embodiment, commands or data may be transmitted or received between the electronic device 101 and the external electronic device 104 via the server 108 coupled with the second network 199. Each of the external electronic devices 102 or 104 may be a device of the same type as or a different type from the electronic device 101. According to an example embodiment, all or some of operations to be executed by the electronic device 101 may be executed at one or more of the external electronic devices 102, 104, and 108. For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another example embodiment, the external electronic device 104 may include an Internet-of-things (IoT) device. The server 108 may be an intelligent server using machine learning and/or a neural network. According to an example embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various example embodiments may be one of various types of electronic devices. The electronic device may include, for example, a portable communication device (e.g., a smartphone), a computer device, a portable multimedia device, a portable medical device, a camera, a wearable device, a home appliance device, or the like. According to an example embodiment of the disclosure, the electronic device is not limited to those described above.

It should be appreciated that various example embodiments of the present disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof. Terms such as "first", "second", or "first" or "second" may simply be used to distinguish the component from other components in question, and may refer to components in other aspects (e.g., importance or order) is not limited. It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various example embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an example embodiment, the module may be implemented in a form of an application-specific integrated circuit (ASIC).

Various example embodiments as set forth herein may be implemented as software (e.g., the program 140) including one or more instructions that are stored in a storage medium (e.g., an internal memory 136 or an external memory 138) that is readable by a machine (e.g., the electronic device 101) For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. The "non-transitory" storage medium is a tangible device, and may not include a signal (e.g., an electromagnetic wave), but this term does not differentiate between where data is semi-permanently stored in the storage medium and where the data is temporarily stored in the storage medium.

According to an example embodiment, a method according to various example embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various example embodiments, each component (e.g., a module or a program) of the above-described components may include a single entity or multiple entities, and some of the multiple entities may be separately disposed in different components. According to various example embodiments, one or more of the above-described components may be omitted, or one or more other components may be added. Alternatively or additionally, a plurality of components (e.g., modules or programs) may be integrated into a single component. In such a case, according to various example embodiments, the integrated component may still perform one or more functions of each of the plurality of components in the same or similar manner as they are performed by a corresponding one of the plurality of components before the integration. According to various example embodiments, operations performed by the module, the program, or another component may be carried out sequentially, in parallel, repeatedly, or heuristically, or one or more of the operations may be executed in a different order or omitted, or one or more other operations may be added.

Figure 2A:
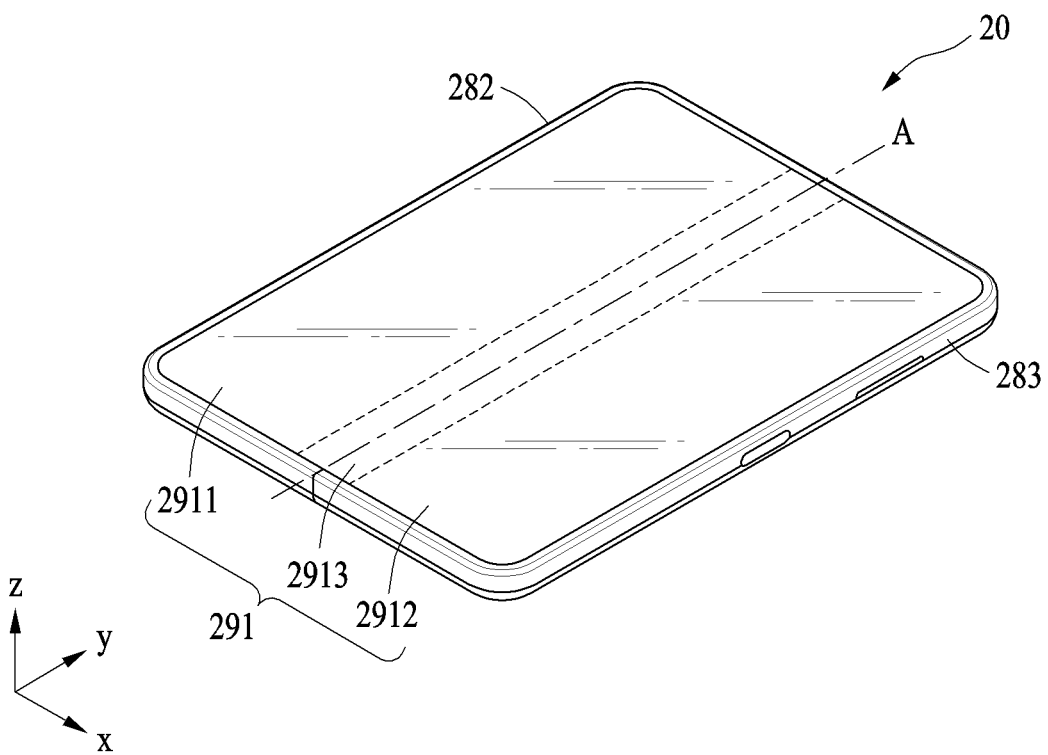
FIG. 2A is a front perspective view of a foldable electronic device in an unfolded state according to various example embodiments.
Figure 2B:
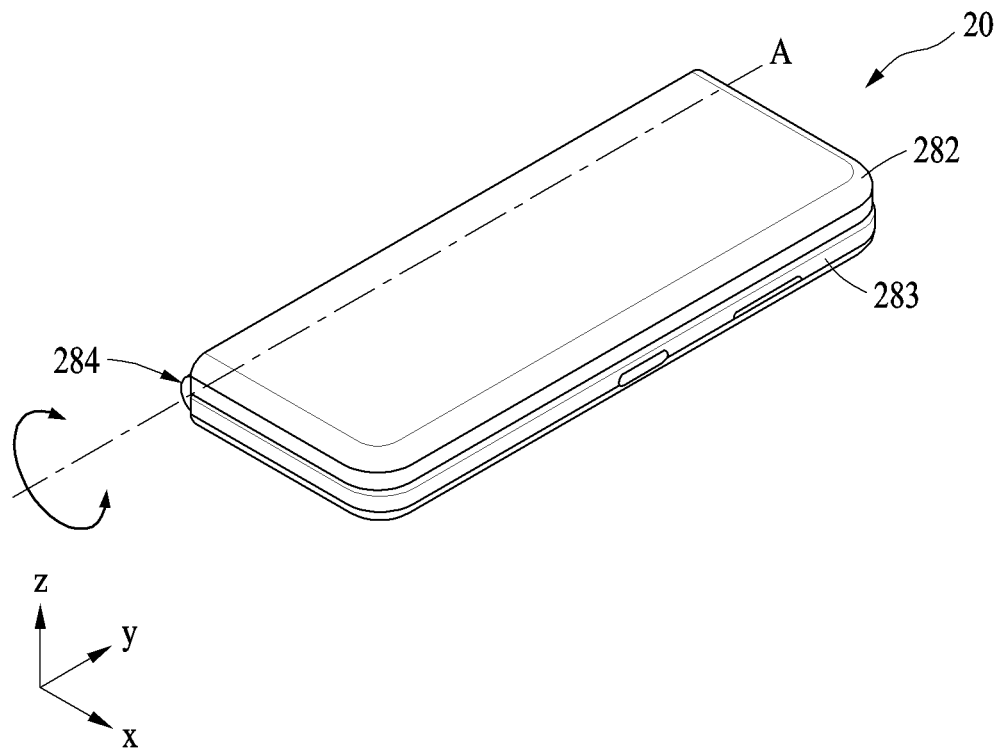
FIG. 2B is a perspective view of the foldable electronic device in a folded state according to various example embodiments.

FIG. 2A is a front perspective view of a foldable electronic device in an unfolded state according to various example embodiments; FIG. 2B is a perspective view of the foldable electronic device in a folded state according to various example embodiments, and FIG. 2C is a diagram illustrating a rear view of the electronic device according to various example embodiments.

Figure 2C:
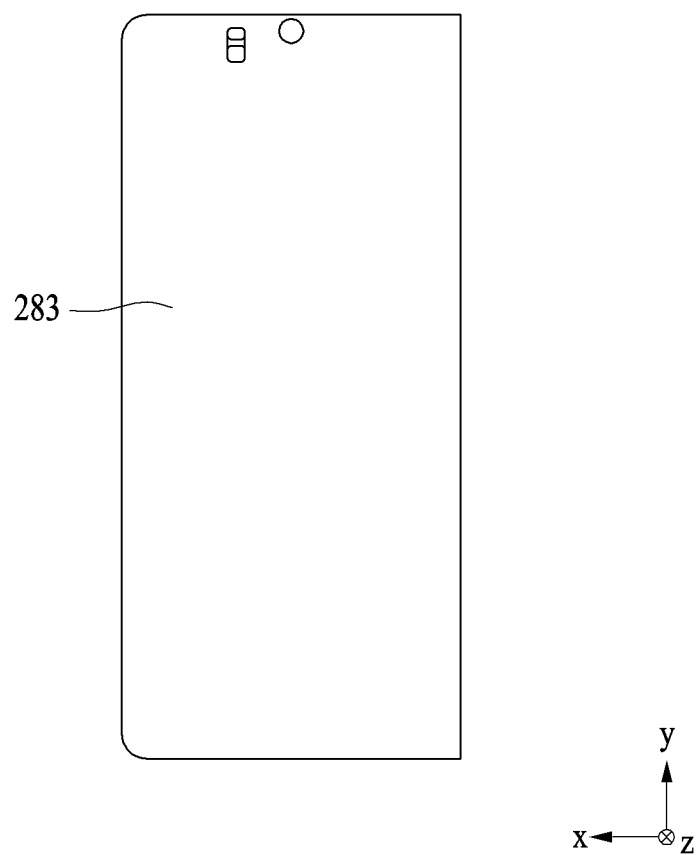
FIG. 2C is a diagram illustrating a rear view of the electronic device according to various example embodiments.

Referring to FIGS. 2A, 2B and 2C (which may be referred to as FIGS. 2A to 2C), an electronic device 20 (for example, the electronic device 101 of FIG. 1) including a bonding layer in contact with an active area of a digitizer (hereinafter, referred to as the "electronic device") may be transformed depending on usage. For example, the electronic device 20 may be provided in a foldable type that a user may selectively fold or unfolded. Hereinafter, the examples are described based on that the electronic device 20 is a foldable type; however, the examples are not limited thereto. In other words, the electronic device 20 (for example, the electronic device 101 of FIG. 1) is not limited to a foldable type device, and may be a typical device, which is not foldable.

In an example embodiment, the electronic device 20 may include a display 291, a first housing 282, a second housing 283, and a hinge assembly 284. In the present disclosure, an externally visible surface of the display 291 may be referred to as a front surface of the electronic device 20 and the display 291, and a surface opposite to the front surface may be referred to as a rear surface of the electronic device 20 and the display 291. A surface enclosing a space between the front surface and the rear surface of the electronic device 20 may be referred to as a side surface of the electronic device 20.

The display 291 may display visual information (e.g., a text, a video, and/or an image) to the user. In an example embodiment, at least one partial area of the display 291 may be deformed into a flat surface or a curved surface such that the display 291 may be deformed in response to a shape change of the electronic device 20. The display 291 may include an axial area 2913, in which a folding axis A is positioned, a first area 2911 disposed on one side of the axial area 2913 (for example, a left area of the axial area 2913 of FIG. 2A), and a second area 2912 disposed on the other side of the axial area 2913 (for example, a right area of the axial area 2913 of FIG. 2A). In this case, an overall shape of the display 291 may be deformed in response to an opening and/or closing operation of the electronic device 20 as an angle formed between the first area 2911 and the second area 2912 is adjusted through the shape deformation of the axial area 2913. For example, the display 291 may be deformed in shape to be in a first state (e.g., an unfolded state in FIG. 2A) in which the first area 2911 and the second area 2912 substantially form the same plane, a second state (e.g., a folded state in FIG. 2B) in which the first area 2911 and the second area 2912 face each other, or an intermediate state in which the first area 2911 and the second area 2912 form a predetermined angle between the first state and the second state.

In an example embodiment, the first area 2911 and the second area 2912 of the display 291 may be symmetrical as a whole with respect to the axial area 2913. However, the first area 2911 or the second area 2912 may include a notch area (not shown) that is partially cut to expose another component (e.g., a camera, a sensor, etc.) through the front surface of the electronic device 20. In this case, a portion of the first area 2911 or the second area 2912 may be asymmetrical.

The areal division of the display 291 described above may be provided as an example, and the display 291 may be divided into a plurality of areas according to functions and structures required by the electronic device 20. For example, the areas of the display 291 are illustrated in FIG. 2A as being divided based on the folding axis A or central area parallel to a y-axis. However, in another example, the areas of the display (not shown) may be divided based on another folding axis that is parallel to an x-axis.

In an example embodiment, the display 291 may include a display panel, a touch panel, a polarizing film, and a window layer. The display panel, the touch panel, the polarizing film, and the window layer may be attached using a pressure-sensitive adhesive (PSA). In an example embodiment, a cushion layer for absorbing an impact applied to the display 210 may be attached to a rear surface of the display panel.

In an example embodiment, the display panel may include a display substrate, a plurality of display elements coupled onto the display substrate, one or more conductive lines coupled to the display substrate and electrically connected to the plurality of display elements, and a thin film encapsulation layer.

The display substrate may be formed of a flexible material, for example, a plastic material such as polyimide (PI), but the material of the display substrate is not limited thereto and may include various materials having flexible properties. The plurality of display elements may be arranged on the display substrate and form some pixels. For example, the plurality of display elements may be arranged in a matrix form on the display substrate to form pixels of the display panel. In this case, the plurality of display elements may include a fluorescent material or an organic fluorescent material capable of expressing colors. For example, the elements of the display 210 may include, for example, and without limitation, organic light emitting diodes (OLEDs). The conductive lines may include one or more gate signal lines or one or more data signal lines. For example, the conductive lines may include a plurality of gate signal lines and a plurality of data signal lines, and the plurality of gate signal lines and the plurality of data signal lines may be arranged in a matrix form. In this case, the plurality of display elements may be arranged adjacent to a point where a plurality of lines intersect, and may be electrically connected to each line. The thin film encapsulation layer may cover the display substrate, the plurality of display elements, and the conductive lines, thereby preventing and/or reducing an inflow of oxygen and moisture from outside. In an example embodiment, the thin film encapsulation layer may be formed by alternately stacking one or more organic film layers and one or more inorganic film layers.

In an example embodiment, the touch panel may be formed as an integral body on the display panel or attached thereto. For example, the touch panel may be formed by patterning an aluminum metal mesh sensor on the thin film encapsulation layer of the display panel.

In an example embodiment, the polarizing film may be stacked between the display panel and the touch panel. The polarizing film may improve visibility of the display 291. The polarizing film may change a phase of light passing through the display 291. For example, the polarizing film may convert linearly polarized light into circularly polarized light or convert circularly polarized light into linearly polarized light, thereby preventing and/or reducing reflection of light incident to the display panel.

The window layer may be formed of a transparent plastic film having high flexibility and high hardness. For example, the window layer may be formed of a PI or polyethylene terephthalate (PET) film. In an example embodiment, the window layer may be formed as multiple layers including a plurality of plastic films.

Figure 3A:
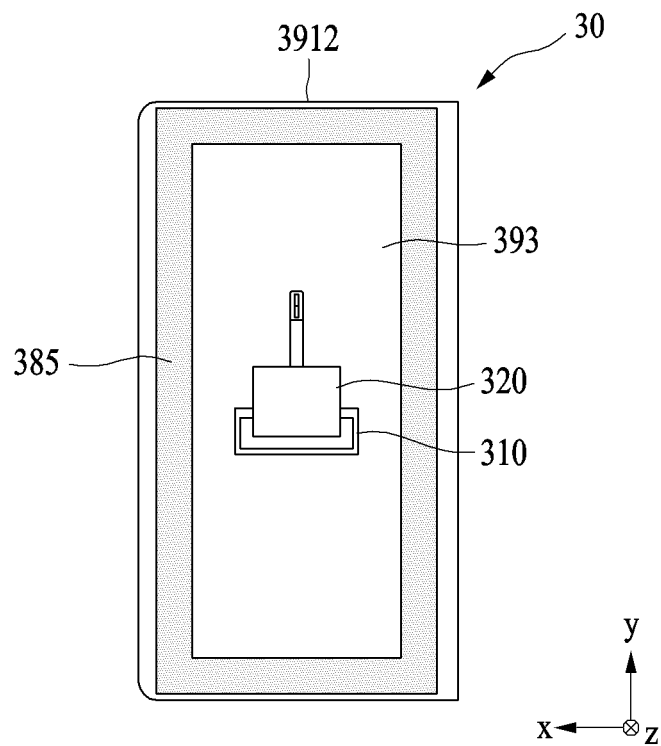
FIG. 3A is a diagram illustrating rear view of a foldable electronic device in a folded state including a bonding layer in contact with an active area of a digitizer according to various example embodiments.

FIG. 3A is a rear view of an electronic device including a bonding layer in contact with an active area of a digitizer according to various example embodiments, and illustrates the electronic device folded. FIG. 3A is a rear view of the electronic device including the bonding layer in contact with the active area of the digitizer according to various example embodiments, and illustrates the electronic device unfolded.

Figure 3B:
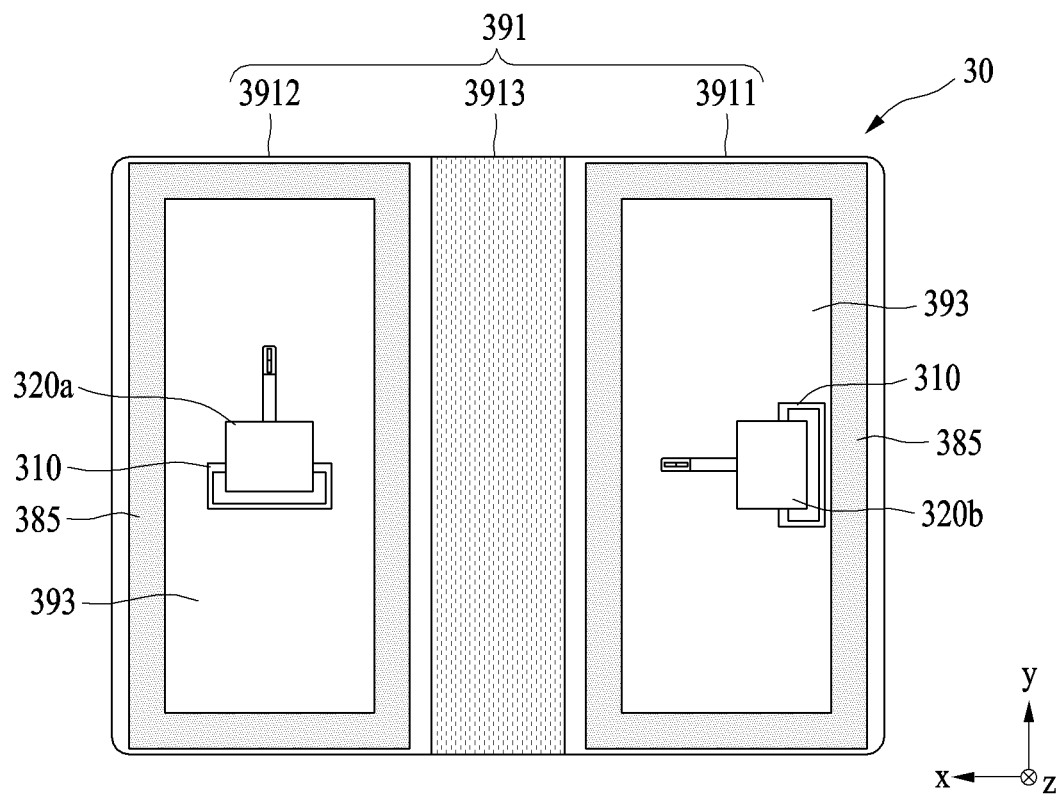
FIG. 3B is a rear view of the foldable electronic device in an unfolded state including the bonding layer in contact with the active area of the digitizer according to various example embodiments.

FIGS. 3A and 3B are diagrams illustrating a foldable electronic device 30 (for example, the electronic device 101 of FIG. 1 and the electronic device 20 of FIG. 2A) from which a first housing (for example, the first housing 282 of FIG. 2A), a second housing (for example, the second housing 283 of FIG. 2A), and a hinge assembly (for example, the hinge assembly 284 of FIG. 2A) are removed for ease of description.

Referring to FIGS. 3A and 3B, the electronic device 30 may include a display 391, a digitizer 310 disposed on a rear surface of the display 391, a main magnet 393 disposed on a rear surface of the digitizer 310, a flexible printed circuit board 320 electrically connected to the digitizer 310 through the main magnet 393, and waterproof tape 385 providing a waterproof function. The display 391 may include a first area 3911, a second area 3912, and an axial area 3913.

In an example embodiment, the digitizer 310 may detect position information indicated by a user from a front surface of the display 391. The digitizer 310 may be referred to as a touch screen, and an electric graphic input panel (EGIP). The digitizer 310 may be operated by any one or any combination of a resistive method, a capacitive method, and/or an electromagnetic resonance method.

The resistive method may be a method of sensing a position pressed by pressure using a current amount change when a direct current voltage is applied, and may sense two thin conductive layers being directly contacted by pressure by a finger or a pen. Since the resistive method detects a position by pressure, the resistive method may be operated regardless of whether a target of detection is a conductor or a nonconductor.

The capacitive method may be a method of sensing using capacitance coupling when alternating current voltage is applied, and thus, a target of detection has to be a conductor, and at least a predetermined area for a contact surface may be required to cause a detectable change in capacitance.

The electromagnetic resonance method may adopt a plurality of coils. When a user moves a pen, the pen may generate a magnetic field, and the magnetic field may induce a signal to the coils. The digitizer may detect a position of the pen using the induced signal in the coils.

In an example embodiment, the main magnet 393 for enhancing the signal detection performance of the digitizer 310 may be provided on the rear surface of the digitizer 310. The main magnet 393 may be provided with a hole through which the flexible printed circuit board 320 may enter to connect the flexible printed circuit board 320 to the digitizer 310. For example, the hole provided in the main magnet 393 may be provided in a central portion of the magnet. The digitizer 310 may be provided on each of the first area 3911 and the second area 3912.

In an example embodiment, the flexible printed circuit board 320 may be electrically connected to the digitizer 310. The flexible printed circuit board 320 may transmit information, which is detected by the digitizer 310, to a processor (for example, the processor 120 of FIG. 1). The flexible printed circuit board 320 may provide a plurality of substrate wires for transmitting information. A pair of flexible printed circuit boards 320a and 320b may be provided as the flexible printed circuit board 320, and may be each disposed in a different direction from the digitizer 310 provided in the first area 3911 and the digitizer 310 provided in the second area 3912. For example, the flexible printed circuit board 320a connected to the digitizer 310 provided in the first area 3911 may be provided where a length direction thereof is an y-axial direction, and the flexible printed circuit board 320b connected to the digitizer 310 provided in the second area 3912 may be provided where a length direction thereof is an x-axial direction. Unlike shown in the drawings, the pair of flexible printed circuit boards 320a and 320b may be provided in a same direction.

In an example embodiment, the waterproof tape 385 may reduce or prevent and/or reduce an influx of moisture and/or a foreign material into the inside of the electronic device 30. The waterproof tape 385 may be, for example, disposed on a rear surface of the display 391 and/or the main magnet 393 while forming a closed curve. A bonding portion (not shown) to bond the flexible printed circuit board 320 and the digitizer 310 may be placed inside the waterproof tape 385.

Figure 4A:
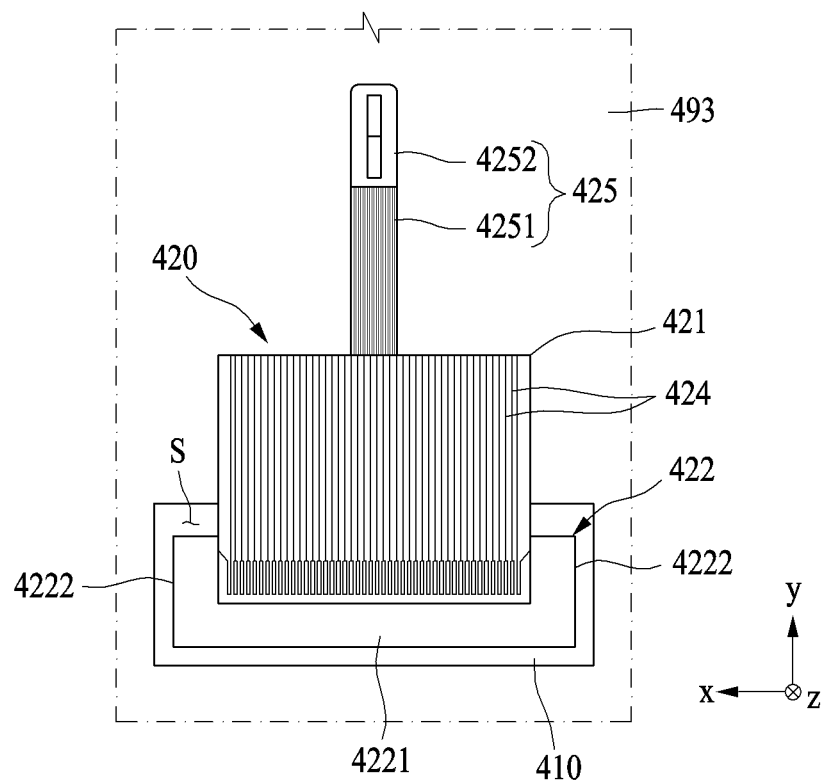
FIG. 4A is a partially enlarged view of a flexible printed circuit board and a magnet according to various example embodiments.
Figure 4B:
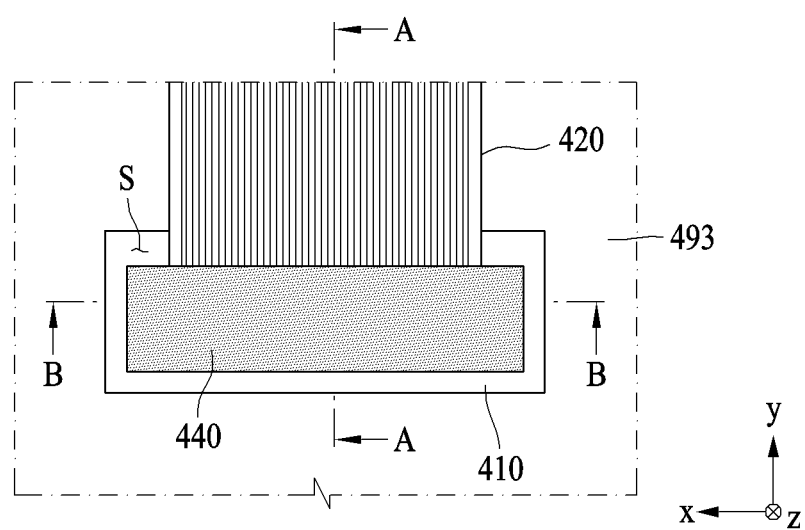
FIG. 4B is a partially enlarged view of a cover layer placed on the flexible printed circuit board according to various example embodiments.

FIG. 4A is a diagram illustrating a partially enlarged view of a flexible printed circuit board and a magnet according to various example embodiments, and FIG. 4B is a diagram illustrating a partially enlarged view of a cover layer disposed on the flexible printed circuit board according to various example embodiments.

Referring to FIGS. 4A and 4B, a flexible printed circuit board 420 may include a base part 421, an extension part 422, a plurality of substrate wires 424, and a connector 425.

In an example embodiment, at least a portion of the base part 421 may be placed on a main magnet 493, and another portion of the base part 421 may enter toward a digitizer 410 through a hole provided in the main magnet 493. A bonding layer (not shown) for physically and electrically connecting the flexible printed circuit board 420 and the digitizer 410 may be provided at an end portion of the base part 421.

In an example embodiment, the extension part 422 may be extended from the base part 421. The extension part 422 may include a first extension part 4221 extending from the base part 421 in a y-axial direction, which is a first direction, and a second extension part 4222 extending from the base part 421 in an x-axial direction, which is a second direction intersecting with the first direction. The base part 421, the first extension part 4221, and the second extension part 4222 may be integrally formed with each other. The extension part 422 may be disposed in a space S formed between the base part 421 and the main magnet 493. When manufacturing an electronic device (for example, the electronic device 101 of FIG. 1 and the electronic device 20 of FIG. 2A), the extension part 422 may reduce an occurrence of an unintentional gap between layers configuring a display by reducing a size of the space S formed between the base part 421 and the main magnet 493. For example, the extension part 422 may reduce an unintentional gap from occurring between at least two layers among a display panel, a touch panel, a polarizing film, and/or a window layer. The unintentional gap may cause a visibility difference.

In an example embodiment, the plurality of substrate wires 424 may electrically receive a signal from the digitizer 410. For example, the plurality of substrate wires 424 may be formed in a direction of which a length direction thereof is a y-axial direction, which is a first direction, and be each disposed at intervals in an x-axial direction, which is a second direction.

In an example embodiment, the connector 425 may physically and electrically connect the plurality of substrate wires 424 to a processor (for example, the processor 120 of FIG. 1) of an electronic device (for example, the electronic device 101 of FIG. 1 and the electronic device 20 of FIG. 2A). The connector 425 may include a connector body 4251 extending from the base part 421, and a connector head 4252 provided at an end portion of the connector body 4251.

In an example embodiment, a cover layer 440 may be disposed on a rear surface of a portion inserted into a hole of the main magnet 493 of the flexible printed circuit board 420. The cover layer 440 may compensate for a height difference between the flexible printed circuit board 420 and the main magnet 493. In the present disclosure, a height may represent a length in a z-axial direction and may be referred to as a thickness. The cover layer 440 may overlap with not only the base part 421 of the flexible printed circuit board 420 but the extension part 422 in the z-axial direction. The cover layer 440 may overlap with the first extension part 4221 and/or the second extension part 4222 in the z-axial direction.

Figure 5A:
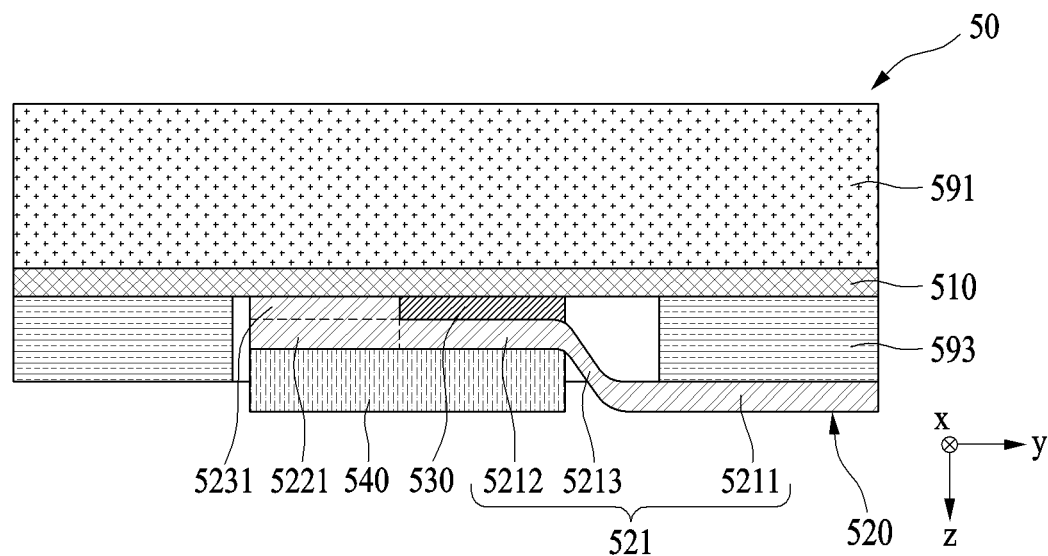
FIG. 5A is a cross-sectional view taken along a line A-A of FIG. 4B according to various example embodiments.
Figure 5B:
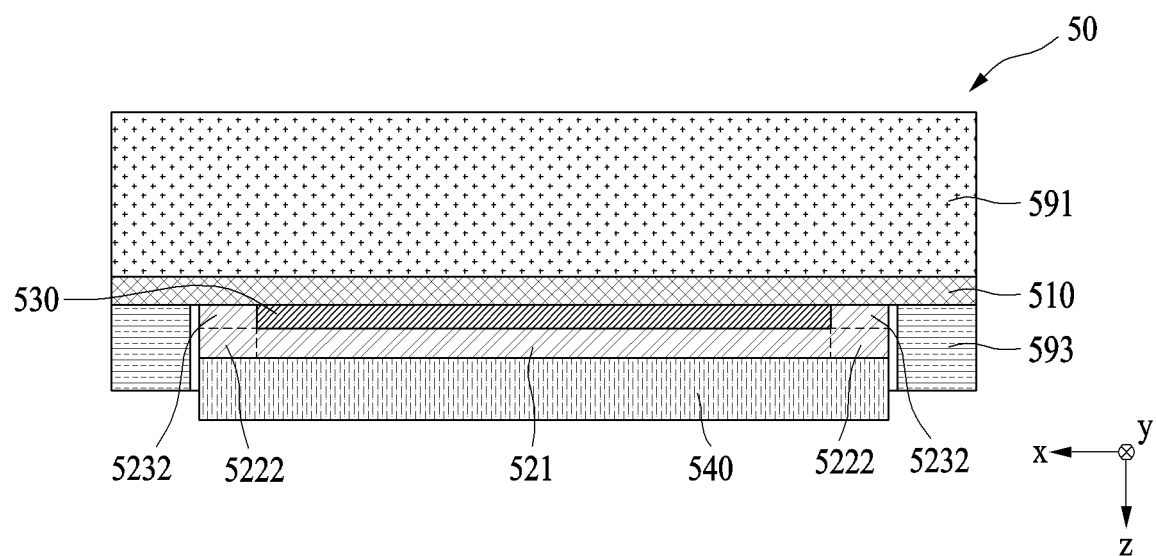
FIG. 5B is a cross-sectional view taken along a line B-B of FIG. 4B according to various example embodiments.

FIG. 5A is a cross-sectional view taken along a line A-A of FIG. 4B according to various example embodiments, and FIG. 5B is a cross-sectional view taken along a line B-B of FIG. 4B according to various example embodiments.

Referring to FIGS. 5A and 5B, an electronic device 50 (for example, the electronic device 101 of FIG. 1 and the electronic device 20 of FIG. 2A) may include a display 591, a digitizer 510 connected to a rear surface of the display 591, a main magnet 593 connected to a rear surface of the digitizer 510, a flexible printed circuit board 520 entering toward the digitizer 510 through a hole provided in the main magnet 593, a bonding layer 530 connecting the digitizer 510 and the flexible printed circuit board 520, and a cover layer 540 connected to a rear surface of the flexible printed circuit board 520.

In an example embodiment, the display 591, the digitizer 510, the bonding layer 530, the flexible printed circuit board 520, and the cover layer 540 may be stacked in a z-axial direction.

The bonding layer 530 may contact with an active area of the digitizer 510. A front surface and the rear surface of the digitizer 510 may be the active area. The digitizer 510 may include a plurality of wires. A face, of which normal lines are a length direction of each of the plurality of wires and a direction perpendicular to a direction in which each of the plurality of wires is disposed, may be the active area of the digitizer 510. For example, in case the wires provided at the digitizer 510 are disposed in a y-axial direction, wherein a length direction of the wires is provided in an x-axial direction, the active area of the digitizer 510 may be a face of which a normal line is a z-axial direction.

In an example embodiment, the flexible printed circuit board 520 may include a base part 521, a first extension part 5221, a second extension part 5222, a first protruding part 5231, and a second protruding part 5232. The base part 521 may include a base body 5211 placed on a rear surface of the main magnet 593, a base head 5212 connected to the bonding layer 530, and a base connector 5213 connecting the base body 5211 and the base head 5212. In the present disclosure, the first extension part 5221 and the second extension part 5222 may be referred to as an extension part, and the first protruding part 5231 and the second protruding part 5232 may be referred to as a protruding part.

In example embodiments, the first and second extension parts 5221 and 5222 may respectively extend toward the main magnet 593 from the base part 521. The first extension part 5221 may extend in a −y direction, and the second extension part 5222 may extend in +x and −x directions. The first and second extension parts 5221 and 5222 may be provided in a space between the bonding layer 530 and the main magnet 593, and may compensate for a height difference between the rear surface of the digitizer 510 and the main magnet 593. Although the example illustrates that the second extension part 5222 extends both in +x and −x directions, the example is not limited thereto. For example, the second extension part 5222 may extend only in one of +x and −x directions.

In an example embodiment, the first and second protruding parts 5231 and 5232 may respectively protrude toward the digitizer 510 from the extension part and be disposed in parallel with the bonding layer 530. The first protruding part 5231 may protrude toward the digitizer 510 from the first extension part 5221, and the second protruding part 5232 may protrude toward the digitizer 510 from the second extension part 5222. The first and second protruding parts 5231 and 5232 may be provided in a space between the bonding layer 530 and the main magnet 593 with the first and second extension parts 5221 and 5222, and may compensate for a height difference between the rear surface of the digitizer 510 and the main magnet 593.

In an example embodiment, the first protruding part 5231 and/or the second protruding part 5232 may contact with the digitizer 510. For example, a sum of thicknesses of the first protruding part 5231 and the first extension part 5221 may be equal to a sum of thicknesses of the bonding layer 530 and the base head 5212. According to the structure, when manufacturing the electronic device 50, an unintentional gap may be reduced from occurring between the display 591 and the digitizer 510 or an unintentional gap formed inside the display 591 may be reduced from occurring, since a step formed between the bonding layer 530 and the first protruding part 5231 and/or the second protruding part 5232 may be reduced from occurring or removed.

In an example embodiment, the cover layer 540 may be placed on an opposite side of the bonding layer 530 based on the base part 521, and may be attached to the flexible printed circuit board 520. For example, the cover layer 540 may be attached to the base part 521 and the first and second extension parts 5221 and 5222. The cover layer 540 may compensate for a height difference between the flexible printed circuit board 520 and the main magnet 593.

In an example embodiment, a sum of thicknesses of the bonding layer 530, the base part 521, and the cover layer 540 may be equal to or greater than a thickness of the main magnet 593. For example, the cover layer 540 may be formed of an elastic material. When manufacturing the electronic device 50, the cover layer 540 may be compressed and deformed. Even though the sum of thicknesses of the bonding layer 530, the base part 521, and the cover layer 540 is greater than the thickness of the main magnet 593, a height difference may be reduced while receiving pressure in case the cover layer 540 includes an elastic deformable material.

In an example embodiment, a sum of thicknesses of the first protruding part 5231, the first extension part 5221, and the cover layer 540 may be equal to or greater than the thickness of the main magnet 593. A sum of thicknesses of the second protruding part 5232, the second extension part 5222, and the cover layer 540 may be equal to or greater than the thickness of the main magnet 593.

Figure 6A:
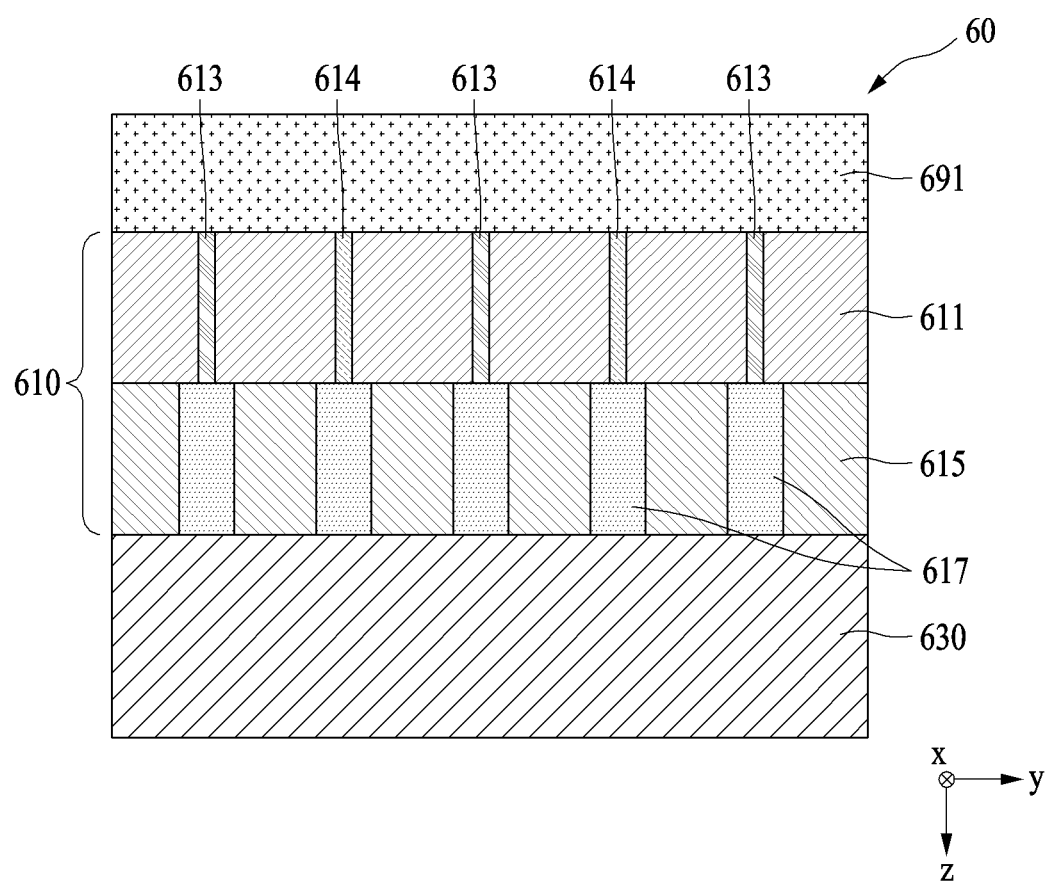
FIG. 6A is a cross-sectional view of a digitizer and a bonding layer according to various example embodiments.
Figure 6B:
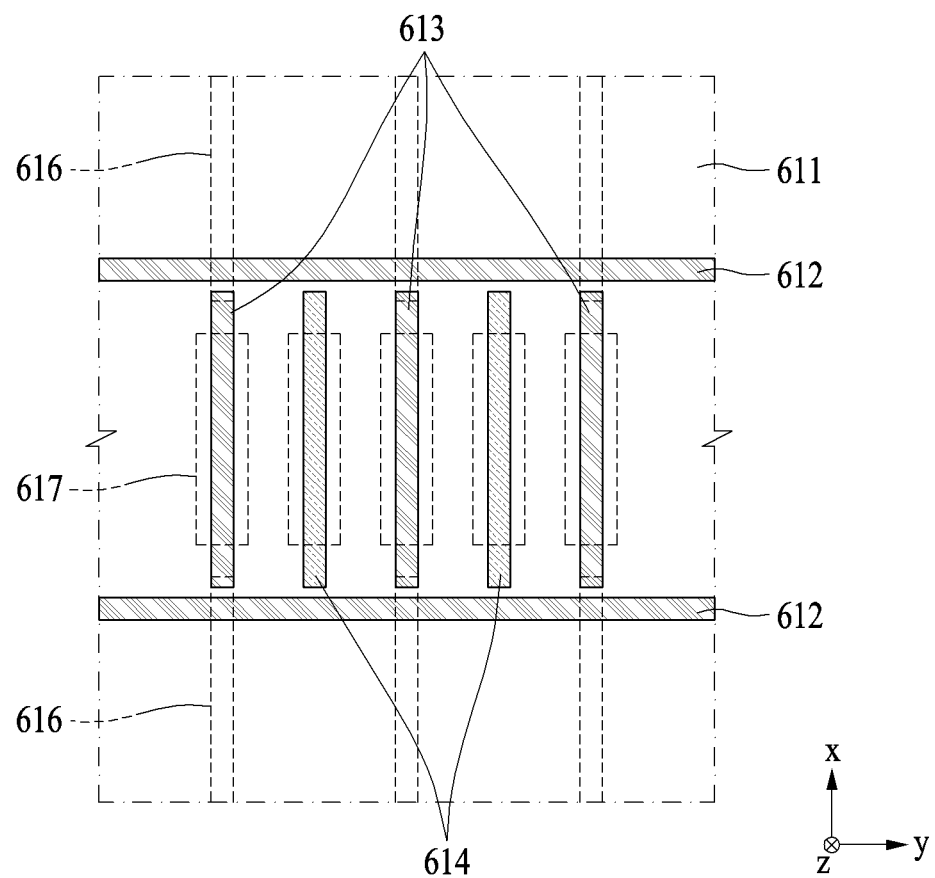
FIG. 6B is a diagram illustrating a first layer of the digitizer according to various example embodiments.

FIG. 6A is a cross-sectional view of a digitizer and a bonding layer according to various example embodiments, FIG. 6B is a diagram illustrating a first layer of the digitizer according to various example embodiments.

Figure 6C:
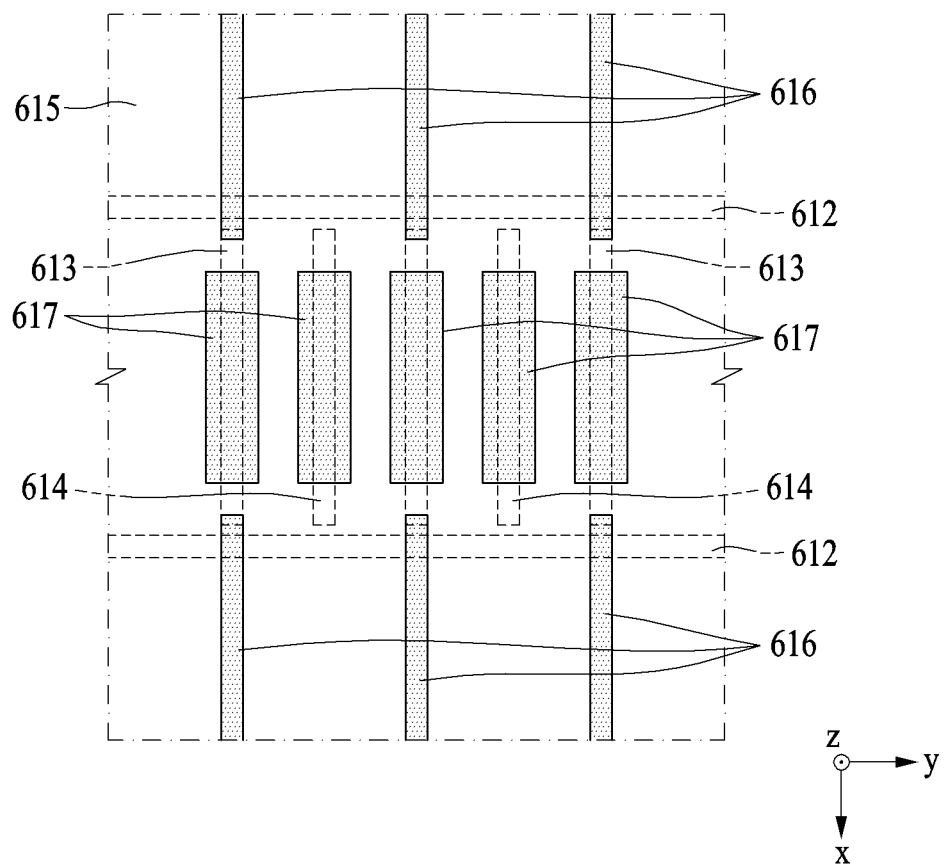
FIG. 6C is a diagram illustrating a second layer of the digitizer according to various example embodiments.

Referring to FIGS. 6A to 6C, an electronic device 60 (for example, the electronic device 101 of FIG. 1 and the electronic device 20 of FIG. 2A) may include a display 691, a digitizer 610, and a bonding layer 630.

In an example embodiment, the digitizer 610 may include a first layer 611 attached to a rear surface of the display 691, a crossline 612 disposed on the first layer 611, a plurality of first wires 613 disposed in the first layer 611, a dummy wire 614 disposed between two adjacent wires among the plurality of first wires 613, a second layer 615 attached to a rear surface of the first layer 611, a second wire 616 disposed on the second layer 615 and overlapping with the plurality of first wires 613, and a plurality of wire pads 617 disposed in the second layer 615 and overlapping with the plurality of first wires 613 or the dummy wire 614.

The dummy wire 614 may enhance a bonding condition between the display 691 and the digitizer 610 and a bonding condition between the digitizer 610 and the bonding layer 630 by being disposed between two adjacent wires among the plurality of the first wires 613. For example, a thickness of the first wire 613 may be approximately 10 μm to 20 μm, or 15 μm. In a space between the two adjacent wires of the first wires 613, the dummy wire 614 may assist bonding therebetween by reducing a step from occurring in an area between the digitizer 610 and the bonding layer 630, and an area between the display 691 and the digitizer 610.

In an example embodiment, the wire pads 617 may be provided at a bottom side of the first wires 613 and the dummy wire 614, such that the wire pad 617 may assist to perform bonding between the display 691 and the digitizer 610 and bonding between the digitizer 610 and the bonding layer 630.

In an example embodiment, the crossline 612 may be disposed on the first layer 611 and may be provided where a length direction thereof is a y-axial direction. The first wires 613 may be disposed in the first layer 611 and may be provided where a length direction thereof is an x-axial direction. The plurality of first wires may be disposed in a y-axial direction. The crossline 612 and the first wire 613 may be spaced apart from each other.

In an example embodiment, the second wire 616 may be disposed on the second layer 615 and may be provided where a length direction thereof is an x-axial direction. The second wire 616 may overlap with the crossline 612 and the first wire 613 in a z-axial direction. The second wire 616 may electrically connect the crossline 612 and the first wire 613. The second wire 616 may form a node with the crossline 612.

In an example embodiment, the wire pads 617 may be disposed in parallel with the second wire 616. The wire pads 617 may overlap the first wires 613 or the dummy wire 614 in the z-axial direction.

Figure 7A:
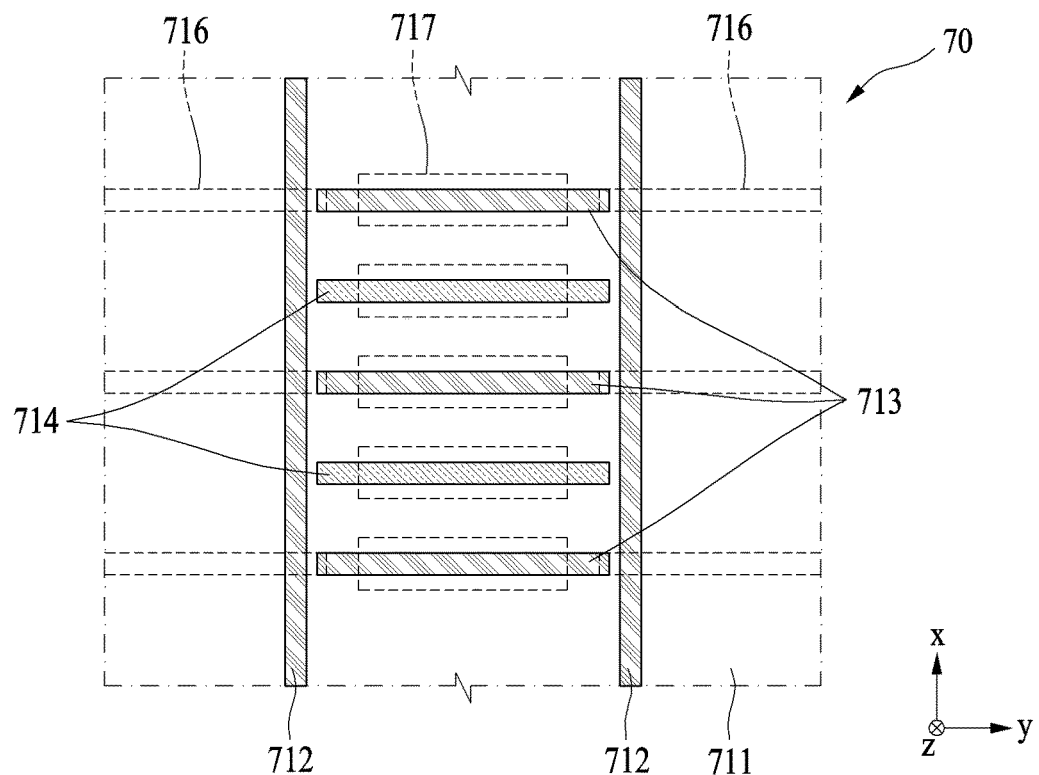
FIG. 7A is a diagram illustrating a first layer of a digitizer according to various example embodiments.
Figure 7B:
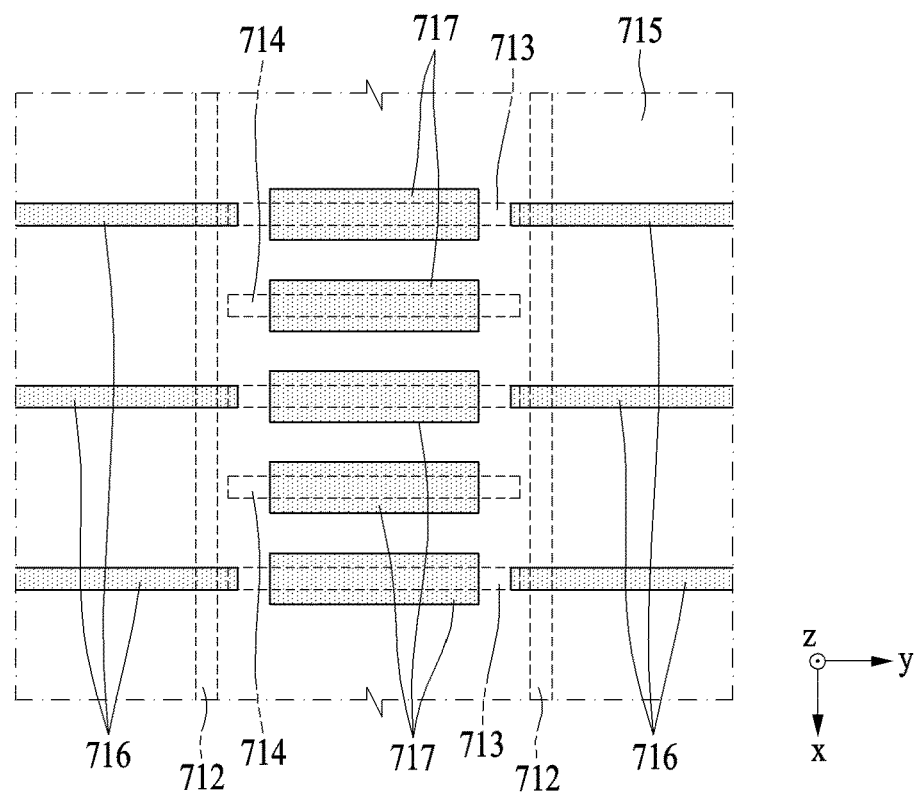
FIG. 7B is a diagram illustrating a second layer of the digitizer according to various example embodiments.

FIG. 7A is a diagram illustrating a first layer of a digitizer according to various example embodiments, and FIG. 7B is a diagram illustrating a second layer of the digitizer according to various example embodiments.

Referring to FIGS. 7A and 7B, a digitizer 70 may include a first layer 711, a crossline 712 dispose on the first layer 711, a plurality of first wires 713 disposed on the first layer 711, a dummy wire 714 disposed between two adjacent wires of the plurality of the first wires 713, a second layer 715 attached to a rear surface of the first layer 711, a second wire 716 disposed on the second layer 715 and overlapping with the plurality of first wires 713, and a plurality of wire pads 717 disposed on the second layer 715 and overlapping with the plurality of first wires 713 or the dummy wire 714.

In an example embodiment, the crossline 712 may be disposed on the first layer 711 and may be provided where a length direction thereof is an x-axial direction. The first wires 713 and the dummy wire 714 may be disposed on the first layer 711 and may be provided where a length direction thereof is a y-axial direction. The plurality of first wires 713 and the dummy wire 714 may be disposed in an x-axial direction.

In an example embodiment, the second wire 716 may be disposed on the second layer 715 and may be provided where a length direction thereof is a y-axial direction. The second wire 716 may overlap with the crossline 712 and the first wires 713 in a z-axial direction.

Figure 8:
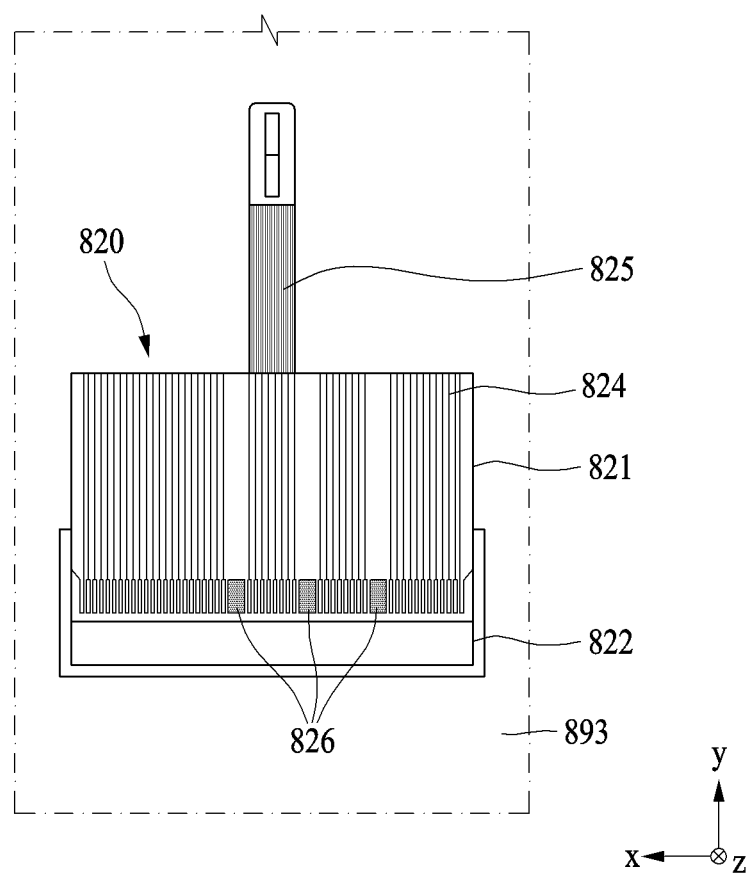
FIG. 8 is a diagram illustrating a partially enlarged view of a flexible printed circuit board and a magnet according to various example embodiments.

FIG. 8 is a partially enlarged view of a flexible printed circuit board and a magnet according to various example embodiments.

Referring to FIG. 8, a flexible printed circuit board 820 may include a base part 821 of which at least a portion enters through a hole of a main magnet 893, an extension part 822 extending from the base part 821 toward the main magnet 893, a connector 825 connected to the base part 821, a plurality of substrate wires 824 disposed along the base part 821 and the connector 825, and at least one mark pad 826 provided on the base part 821.

In an example embodiment, the mark pad 826 may be provided between two adjacent substrate wires 824 among the plurality of substrate wires 824. The mark pad 826 may function as a fiducial mark. The number of mark pads 826 is illustrated as three in the drawings, however, the number is not limited thereto.

Figure 9:
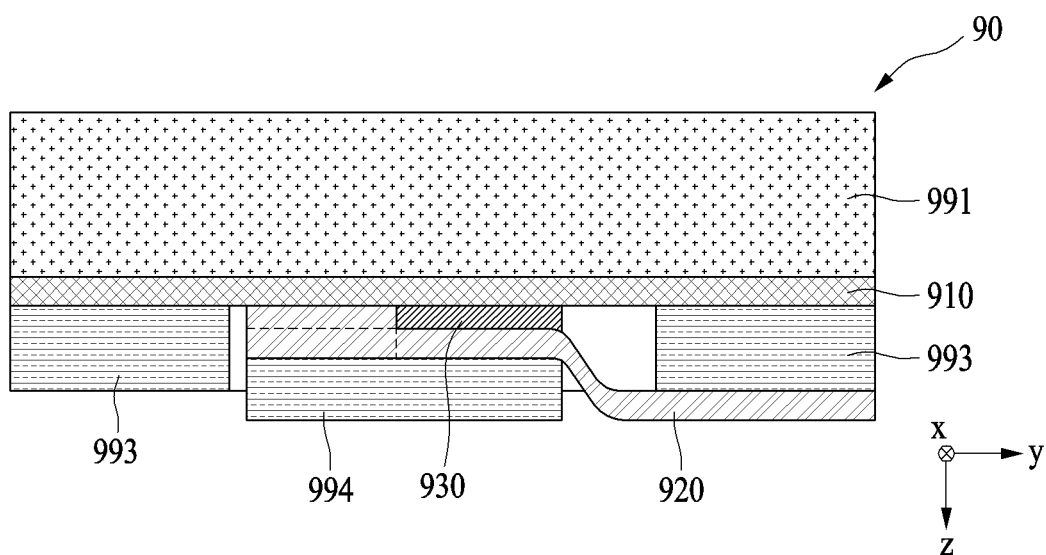
FIG. 9 is a cross-sectional view of an electronic device according to various example embodiments.

FIG. 9 is a cross-sectional view of an electronic device according to various example embodiments.

Referring to FIG. 9, an electronic device 90 (for example, the electronic device 101 of FIG. 1 and the electronic device 20 of FIG. 2A) may include a display 991, a digitizer 910 connected to a rear surface of the display 991, a main magnet 993 connected to a rear surface of the digitizer 910, a flexible printed circuit board 920 entering toward the digitizer 910 through a hole provided in the main magnet 993, a bonding layer 930 connecting the digitizer 910 and the flexible printed circuit board 920, and a sub magnet 994 connected to a rear surface of the flexible printed circuit board 920.

In an example embodiment, the sub magnet 994 may be disposed on the flexible printed circuit board 920 and may compensate for a height difference between the flexible printed circuit board 920 and the main magnet 993. A sum of thicknesses of the bonding layer 930, the flexible printed circuit board 920, and the sub magnet 994 may be equal to or greater than a thickness of the main magnet 993.

In an example embodiment, the sub magnet 994 may enhance the signal sensing performance of the digitizer 910 in an area in which the main magnet 993 is not provided, that is, an area in which a hole of the main magnet 993 is formed.

According to various example embodiments, an electronic device including a bonding layer in contact with an active area of a digitizer may include: the digitizer, a main magnet attached to a surface of the digitizer, a flexible printed circuit board electrically connected to the digitizer, and a bonding layer connecting the digitizer and the flexible printed circuit board, wherein the flexible printed circuit board may include a base part overlapping with the bonding layer based on a stacking direction of the digitizer, the flexible printed circuit board, and the bonding layer, and extension parts extending toward the main magnet from the base part.

In various example embodiments, the flexible printed circuit board may further include protruding parts, each protruding toward the digitizer from the extension part, wherein the protruding parts are disposed in parallel with the bonding layer.

The protruding parts may be provided in contact with the digitizer.

In various example embodiments, the electronic device may further include a cover layer disposed on an opposite side of the bonding layer based on the base part, and attached to the flexible printed circuit board.

In various example embodiments, a sum of thicknesses of the bonding layer, the base part, and the cover layer may be equal to or greater than a thickness of the main magnet.

In various example embodiments, a sum of thicknesses of the protruding parts, the extension parts, and the cover layer may be equal to or greater than a thickness of the main magnet.

In various example embodiments, the extension parts may include the first extension part extending from the base part in a first direction, and the second extension part extending from the base part in a second direction intersecting with the first direction.

In various example embodiments, the flexible printed circuit board may include a first protruding part protruding toward the digitizer from the first extension part, and a second protruding part protruding toward the digitizer from the second extension part.

In various example embodiments, the base part may include a base body disposed on the main magnet, a base head disposed on the bonding layer, and a base connector configured to connect the base body and the base head.

In various example embodiments, the digitizer may include a first layer, a plurality of first wires disposed on the first layer, a dummy wire disposed between two adjacent first wires of the plurality of first wires, a second layer attached to the first layer, the second wire disposed on the second layer and overlapping the first wires, and a plurality of wire pads disposed on the second layer and overlapping each of the plurality of first wires and the dummy wire.

The plurality of first wires and the dummy wire may be arranged in a direction in parallel with an extending direction of the extension parts.

Each of length directions of the plurality of first wires and the dummy wire may be in parallel with an extending direction of the extension parts.

The electronic device may further include the sub magnet disposed on the flexible printed circuit board.

A sum of thicknesses of the bonding layer, the flexible printed circuit board, and the sub magnet may be equal to or greater than a thickness of the main magnet.

The flexible printed circuit board may further include a plurality of substrate wires disposed on the base part, and a mark pad disposed between two adjacent substrate wires among the plurality of substrate wires.

According to various example embodiments, an electronic device including a bonding layer in contact with an active area of a digitizer, the digitizer, a flexible printed circuit board electrically connected to the digitizer, and a bonding layer connecting the digitizer and the flexible printed circuit board, wherein the digitizer may include a first layer, a plurality of first wires disposed on the first layer, a dummy wire disposed between two adjacent first wires among the plurality of first wires, a second layer attached to the first layer, a second wire disposed on the second layer and overlapping the first wire, and a plurality of wire pads disposed on the second layer each overlapping with each of the plurality of first wires and the dummy wires.

The flexible printed circuit board may include a base part overlapping the bonding layer based on a stacking direction of the digitizer, the flexible printed circuit board, and the bonding layer, and extension parts extending from the base part.

The flexible printed circuit board may further include protruding parts protruding from the extension part toward the digitizer and disposed in parallel with the bonding layer.

The electronic device may further include the cover layer disposed on an opposite side of the bonding layer based on the base part, and attached to the flexible printed circuit board.

According to various example embodiments, an electronic device including a bonding layer in contact with an active area of a digitizer may include: the digitizer, a flexible printed circuit board electrically connected to the digitizer, and a bonding layer connecting the digitizer and the flexible printed circuit board, wherein the flexible printed circuit board may include a base part overlapping the bonding layer based on a stacking direction of the digitizer, the flexible printed circuit board, and the bonding layer, and extension parts extending from the base part in a direction perpendicular to the stacking direction thereof, and protruding parts protruding toward the digitizer from the extension part.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising a bonding layer in contact with an active area of a digitizer, the electronic device comprising:
   the digitizer;
   a flexible printed circuit board electrically connected to the digitizer; and
   a bonding layer connecting the digitizer and the flexible printed circuit board,
   wherein the flexible printed circuit board comprises a base part overlapping the bonding layer with respect to a stacking direction of the digitizer, the flexible printed circuit board, and the bonding layer, and an extension part extending from the base part in a direction perpendicular to the stacking direction, and a protruding part protruding toward the digitizer from the extension part.

2. An electronic device comprising a bonding layer in contact with an active area of a digitizer, the electronic device comprising:
   the digitizer;
   a main magnet attached to a surface of the digitizer;
   a flexible printed circuit board electrically connected to the digitizer; and
   a bonding layer connecting the digitizer and the flexible printed circuit board,
   wherein the flexible printed circuit board comprises a base part overlapping the bonding layer with respect to a stacking direction of the digitizer, the flexible printed circuit board, and the bonding layer, and an extension part extending toward the main magnet from the base part.

3. The electronic device of claim 2, wherein the flexible printed circuit board further comprises a protruding part protruding toward the digitizer from the extension part, wherein the protruding part is disposed in parallel with the bonding layer.

4. The electronic device of claim 3, wherein the protruding part is in contact with the digitizer.

5. The electronic device of claim 3, further comprising:
   a cover layer disposed on an opposite side of the bonding layer with respect to the base part, and attached to the flexible printed circuit board.

6. The electronic device of claim 5, wherein a sum of thicknesses of the bonding layer, the base part, and the cover layer is equal to or greater than a thickness of the main magnet.

7. The electronic device of claim 5, wherein a sum of thicknesses of the protruding part, the extension part, and the cover layer is equal to or greater than a thickness of the main magnet.

8. The electronic device of claim 2, wherein the extension part comprises a first extension part extending from the base part in a first direction, and a second extension part extending from the base part in a second direction intersecting with the first direction.

9. The electronic device of claim 8, wherein the flexible printed circuit board comprises a first protruding part protruding toward the digitizer from the first extension part, and a second protruding part protruding toward the digitizer from the second extension part.

10. The electronic device of claim 2, wherein the base part comprises a base body disposed on the main magnet, a base head disposed on the bonding layer, and a base connector configured to connect the base body and the base head.

11. The electronic device of claim 2, wherein the digitizer comprises a first layer, a plurality of first wires disposed on the first layer, a dummy wire disposed between two adjacent first wires of the plurality of first wires, a second layer attached to the first layer, a second wire disposed on the second layer and overlapping the first wires, and a plurality of wire pads disposed on the second layer and overlapping the plurality of first wires and the dummy wire.

12. The electronic device of claim 11, wherein the plurality of first wires and the dummy wire are arranged in a direction in parallel with an extending direction of the extension part.

13. The electronic device of claim 11, wherein each of length directions of the plurality of first wires and the dummy wire is parallel with an extending direction of the extension part.

14. The electronic device of claim 2, further comprising:
   a sub magnet disposed on the flexible printed circuit board.

15. The electronic device of claim 14, wherein a sum of thicknesses of the bonding layer, the flexible printed circuit board, and the sub magnet is equal to or greater than a thickness of the main magnet.

16. The electronic device of claim 2, wherein the flexible printed circuit board comprises a plurality of substrate wires disposed on the base part, and a mark pad disposed between two adjacent substrate wires among the plurality of substrate wires.

17. An electronic device comprising a bonding layer in contact with an active area of a digitizer, the electronic device comprising:
- the digitizer;
- a flexible printed circuit board electrically connected to the digitizer; and
- a bonding layer connecting the digitizer and the flexible printed circuit board, wherein the digitizer comprises a first layer, a plurality of first wires disposed on the first layer, a dummy wire disposed between two adjacent first wires among the plurality of first wires, a second layer attached to the first layer, a second wire disposed on the second layer and overlapping the first wire, and a plurality of wire pads disposed on the second layer and overlapping the plurality of first wires and the dummy wire.

18. The electronic device of claim 17, wherein the flexible printed circuit board comprises a base part overlapping the bonding layer with respect to a stacking direction of the digitizer, the flexible printed circuit board, and the bonding layer, and an extension part extending from the base part.

19. The electronic device of claim 18, wherein the flexible printed circuit board further comprises a protruding part protruding from the extension part toward the digitizer and disposed in parallel with the bonding layer.

20. The electronic device of claim 18, further comprising:
- a cover layer disposed on an opposite side of the bonding layer with respect to the base part, and attached to the flexible printed circuit board.

* * * * *